United States Patent [19]

Chisholm

[11] Patent Number: 4,490,062

[45] Date of Patent: Dec. 25, 1984

[54] COUPLINGS FOR SIGN POSTS AND THE LIKE

[76] Inventor: Douglas B. Chisholm, 2865 Sutton Oaks La., Vienna, Va. 22180

[21] Appl. No.: 211,936

[22] Filed: Dec. 1, 1980

Related U.S. Application Data

[63] Continuation-in-part of Ser. No. 898,892, Apr. 21, 1978, Pat. No. 4,236,843.

[51] Int. Cl.³ .............................................. F16B 7/00
[52] U.S. Cl. .......................................... 403/2; 40/606; 29/150
[58] Field of Search ................. 188/375, 376; 40/606, 40/607, 610, 612; 403/2; 285/2, 4; 29/150

[56] References Cited

U.S. PATENT DOCUMENTS

| | | | |
|---|---|---|---|
| 3,106,989 | 10/1963 | Fuchs | 188/375 |
| 3,504,460 | 4/1970 | Solberg | 188/376 X |
| 3,521,917 | 7/1970 | King | 403/2 |
| 3,738,390 | 6/1973 | Luckenbill | 285/2 X |
| 3,820,906 | 6/1974 | Katt | 403/2 |
| 3,846,030 | 11/1974 | Katt | 403/2 |
| 3,912,404 | 10/1975 | Katt | 403/2 |
| 3,961,642 | 6/1976 | Thomas et al. | 403/2 |
| 4,052,826 | 10/1977 | Chisholm | 52/98 |
| 4,071,970 | 2/1978 | Strizki | 403/2 X |
| 4,236,843 | 12/1980 | Chisholm | 403/2 |

FOREIGN PATENT DOCUMENTS 1390889  4/1975  United Kingdom .............. 188/375

Primary Examiner—Andrew V. Kundrat
Attorney, Agent, or Firm—Cushman, Darby & Cushman

[57] ABSTRACT

A frangible coupling utilizable in a sign assembly is provided, formed of a web having a through-extending opening and a plurality of through-extending slits extending outwardly from the opening and defining first and second web portions which will separate under impact loading. The terminations of the slits are short of the end of the web and provide out-of-plane tearing stress concentration. The coupling may be readily manufactured in a variety of manners, such as being cast or even being capable of being stamped. A method of stamping the coupling from a metal plate (e.g. steel plate) is also provided.

13 Claims, 25 Drawing Figures

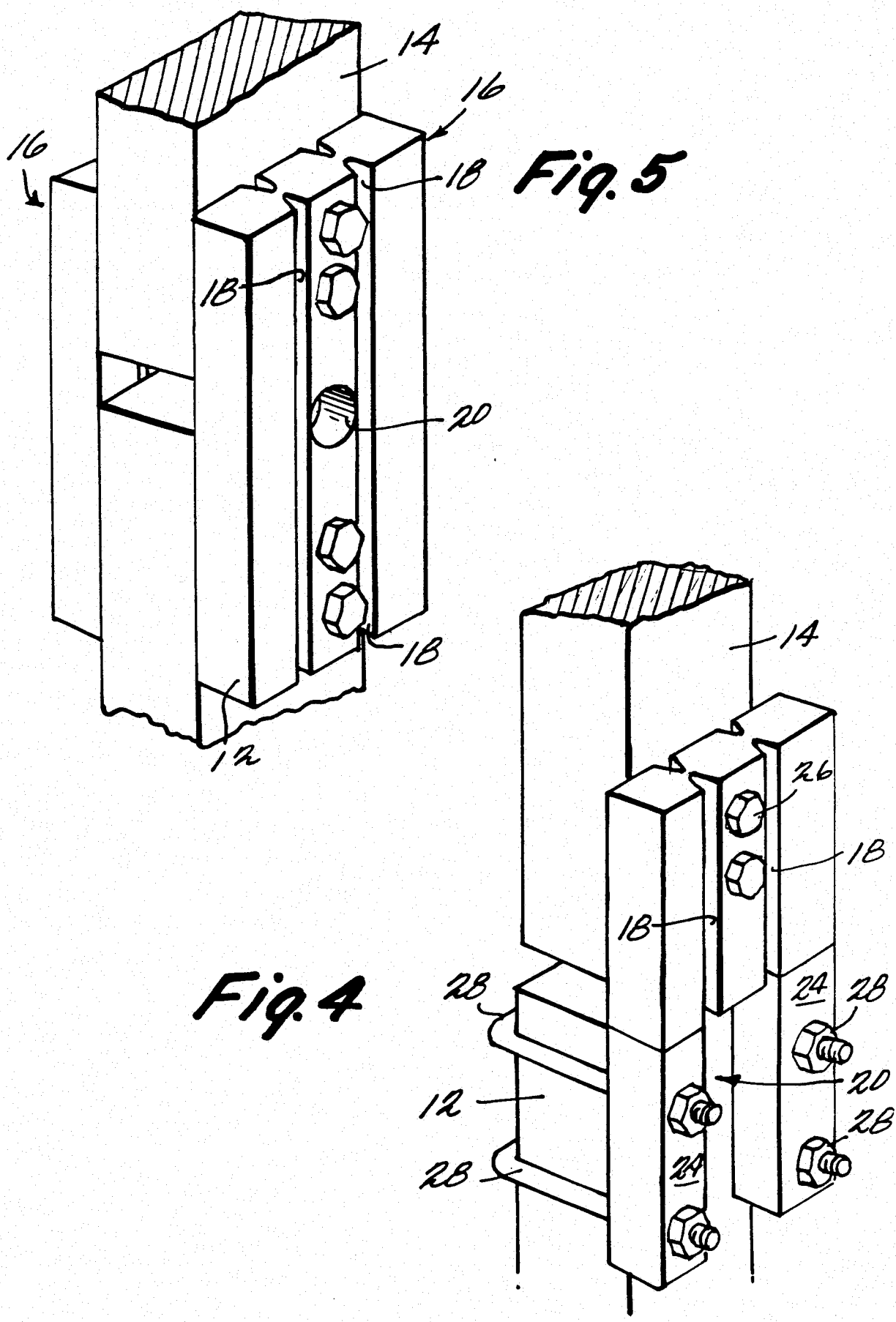

Fig. 6
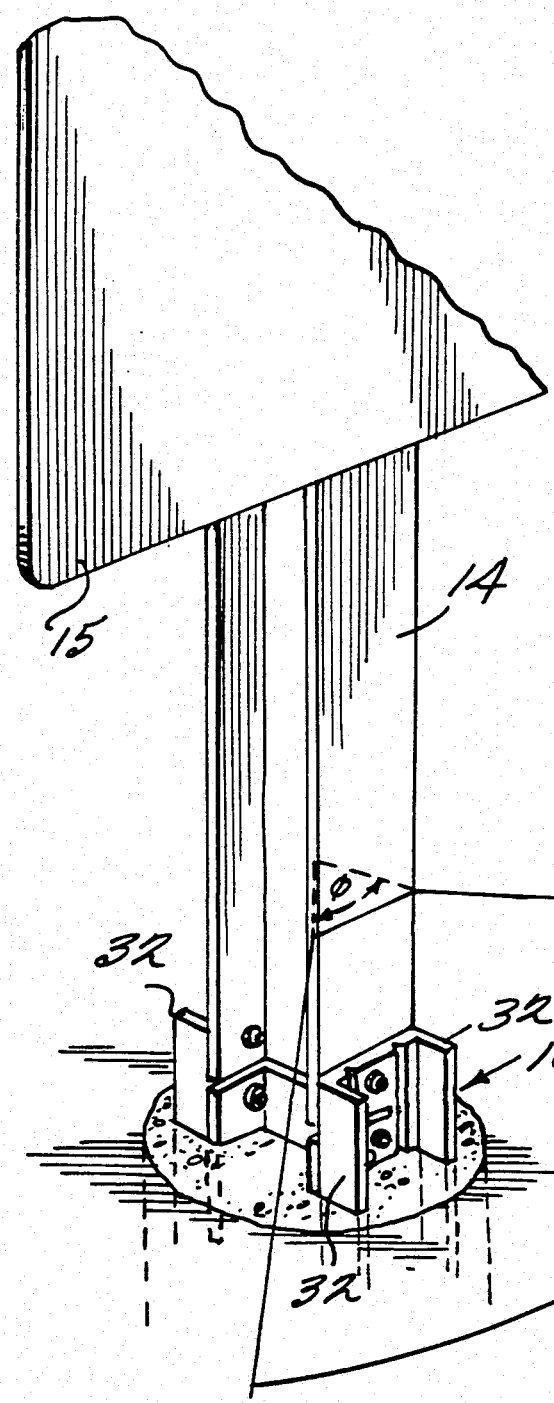
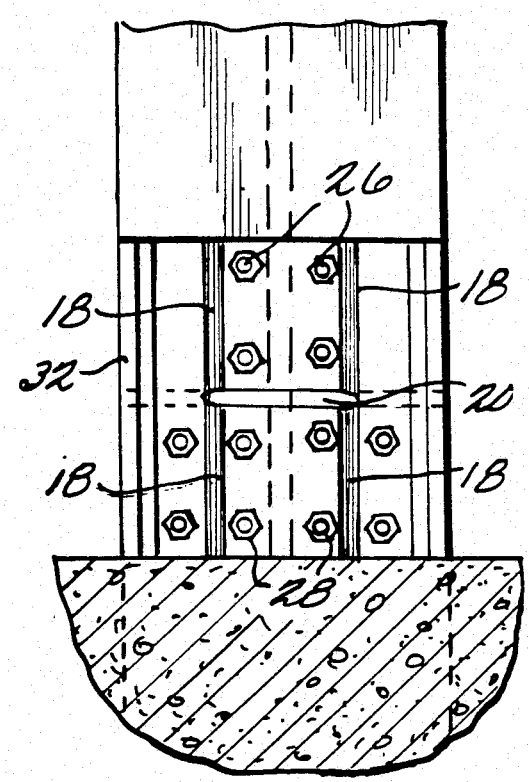
Fig. 7

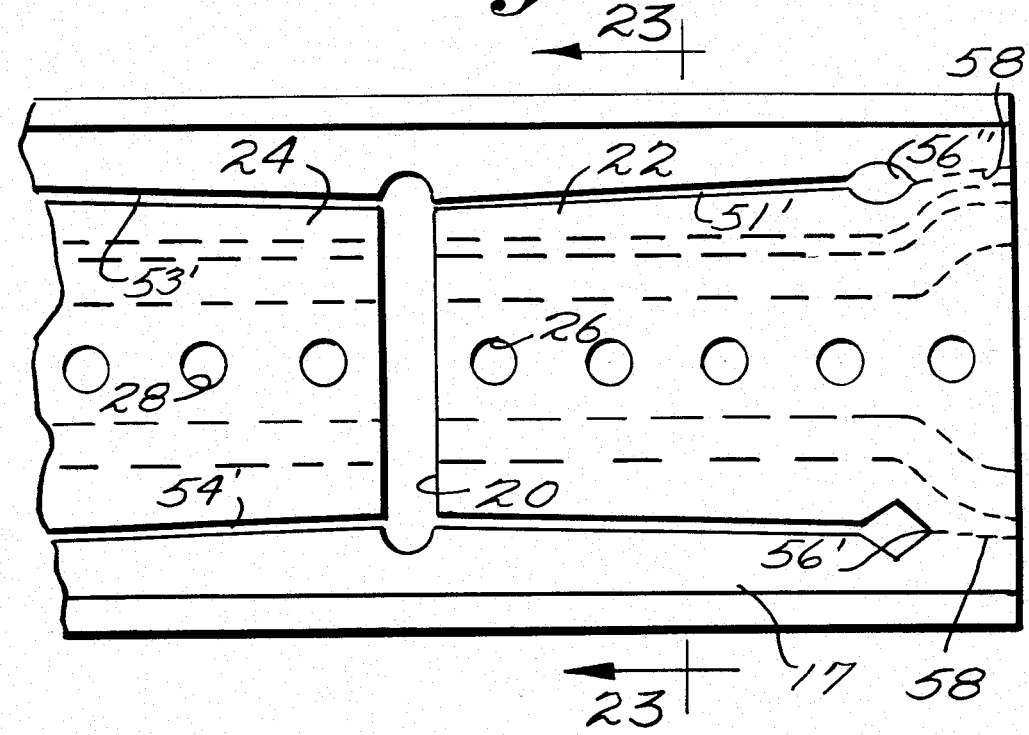
Fig. 21.
Fig. 22.
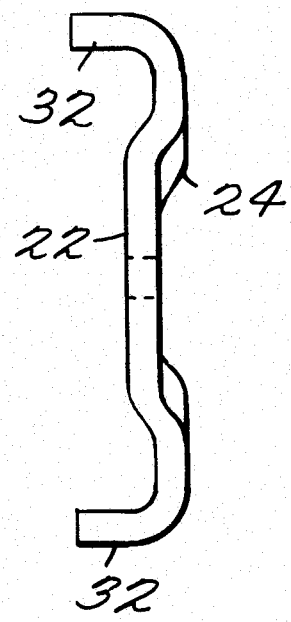
Fig. 23.

4,490,062

COUPLINGS FOR SIGN POSTS AND THE LIKE

CROSS-REFERENCE TO RELATED APPLICATION

This application is a continuation-in-part of application Ser. No. 898,892 filed Apr. 21, 1978, now U.S. Pat. No. 4,236,843.

BACKGROUND AND SUMMARY OF THE INVENTION

There have been many proposals in the past for frangible couplings for supporting highway sign posts and the like. Such frangible couplings are usually provided with one or more horizontal grooves defining a general plane of weakness, such as shown in U.S. Pat. Nos. 3,820,906 and 4,071,970. In constructing and installing such couplings, a trade-off is provided between the ability of the coupling to "give" when subjected to a horizontal impact and the ability of the coupling to support heavy uprights, signs, and the like, especially when the upright is subjected to wind loading. This trade-off exists because both a horizontal impact loading which desirably causes failure along the horizontal groove, and the tensile and wind loading of the upright act in the same way on the coupling. Thus, the coupling grooves must be made deep enough so that the coupling will fail when subjected to a horizontal impact, yet not so deep that the coupling will not support the weight of the upright, especially under wind loading.

According to the present invention, coupling means are provided that will fail easily in an out-of-plane tearing mode when subjected to a horizontal impact, yet is very strong with respect to weight and wind loading. According to the present invention, under impact loading, the coupling means is loaded in bending, for which there is a high stress concentration because of the geometry of the coupling means, and so that under weight or wind loading the coupling means is loaded in shear, where the stress concentration is low or zero.

Segregation of the different types of loading is accomplished according to the present invention by providing coupling webs comprising means defining at least one linear generally vertical groove therein, and means defining a through-extending opening adjacent at least one end of the groove and generally transverse thereto, the opening defining a first portion of the web on one side thereof and a second portion of the web on the other side thereof. Means are provided for attaching the first web portion to a generally vertical upright member, and means are provided for attaching the second web portion to a generally vertical base member. When one or more such webs are used to connect an upright and base together, upon subjection of the upright to a horizontal impact loading the web tears along the groove, high stress concentration being provided. However, when the upright and sign provide weight or wind loadings to the coupling, shearing forces are exerted on the groove, there being no stress concentration for this condition and thus the coupling being able to sustain a load limited only by the metal shear strength along the section at the groove times two, being able to support much higher wind and weight loadings than impact loads. Load ratios of 50:1 or greater are easily achievable with this system.

The coupling means according to the present invention also are fairly insensitive to direction of impact, providing an operational zone of impact of at least about 40 degrees, 20 on either side of the groove, and some embodiments begin essentially directionally insensitive. A wide variety of geometrical configurations may be provided as the coupling means according to the invention, some geometries being less direction-sensitive than others, but all such geometries being capable of supporting high weight and wind loadings but yet fracturing easily under horizontal impact loads.

In order to facilitate manufacture of the couplings according to the invention, they are formed having a plurality of through-extending slits communicating with a through-extending opening in a web providing the coupling. The ends of the slits terminate short of the ends of the web, and have out-of-plane loading stress concentrating terminations. The provision of the through-going slits makes the couplings easier to manufacture, and manufacturable by a wide variety of techniques. Utilizing such through-going slits, the couplings can be manufactured more easily by casting, and may readily be stamped, a method of stamping the coupling, especially from steel, also being provided according to the invention.

It is the primary object of the present invention to provide readily manufacturable coupling members for uprights that will break away when subjected to a horizontal impact. This and other objects of the invention will become clear from an inspection of the detailed description of the invention, and from the appended claims.

BRIEF DESCRIPTION OF THE DRAWINGS

FIGS. 3, 4, 5 and 6 are perspective detail views of other upright assemblies according to the present invention;

FIG. 7 is a front detail view of the assembly of FIG. 6;

FIGS. 17a and 17b are detail sectional views showing configurations that the web grooves may take;

FIG. 21 is a top-plan view of a portion of another modification of the coupling according to the invention, which modification may be readily stamped;

FIG. 22 is an end view of the coupling of FIG. 21; and

FIG. 23 is a cross-sectional view of the coupling of FIG. 21 taking along lines 23—23 thereof.

DETAILED DESCRIPTION OF THE DRAWINGS

Figure 1:
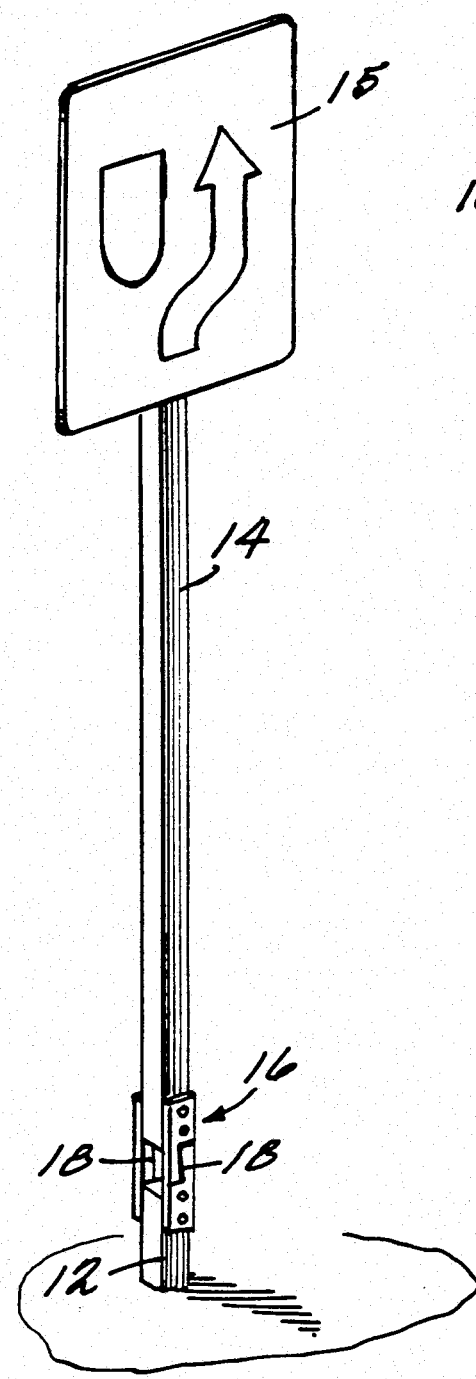
FIG. 1 is a perspective view of an exemplary upright assembly according to the present invention.

A wide variety of coupling webs according to the present invention are shown in the drawings, the coupling webs for mounting to generally vertical upright and base members to provide upright assemblies. The upright assemblies so provided are readily breakable under normal horizontal loading so that less damage is done to a vehicle impacting the assemblies than otherwise would be the case, and additionally less sign damage is done. The term "web" as used in the specification and claims is used generically to encompass plates, angles, channels and the like, such structures having surfaces that are planar or that have a curvature associated therewith.

All of the upright assemblies illustrates in FIGS. 1, 3, 4, 5, 6, 7 8b, 11, 14 and 15 have many features in common. Each upright assembly 10 includes a generally vertical base member 12, a generally vertical member 14, and coupling means 16, for connecting the members 12, 14 so that a horizontal impact loading (see FIGS. 2, 8b, 15 and 16) is distinct from wind and weight loadings (see FIG. 9) so that the coupling means will fail in an out-of-plane tearing mode in response to an impact force of magnitude F applied to the upright member 12 in a generally horizontal direction, yet will not fail in any mode as a result of a compression or tensile loading of magnitude F. being able to sustain much higher tensile and compression loadings (up to fifty times, or greater, higher tensile loads than horizontal loads). Such advantageous force relationships are possible because the coupling means comprises means for loading the couplings so that under impact load the coupling means is loaded in bending, where there is a high stress concentration, and so that under tensile or compression loadings—such as are provided by wind and weight loads—the coupling means is loaded in shear, where there is a low or zero stress concentration.

Each of the embodiments of the coupling means 16 according to the present invention includes at least one web comprising means defining at least one linear generally vertical groove 18 therein, means defining a through-extending opening 20 adjacent at least one end of said groove and generally transverse thereto, said opening 20 defining a first portion 22 of the web on one side thereof and a second portion 24 of the web on the other side thereof, means 26 for attaching the first web portion 22 to one of the members 12, 14, and means 28 for attaching the second web portion to the other of said members. The portions 22, 24 of the web on either side of the opening 20 will separate under impact loading (in response to an impact force in a generally horizontal direction). The attaching means 26, 28 normally will take the form of openings provided in the web that cooperate with bolts, pins, rivets, or like fastening members passing through the members 12, 14. On all embodiments except the FIG. 14 embodiments, two webs preferably are provided mounted on opposite sides of the members 12, 14 (see FIGS. 2, 3, 5, 6, 8b and 11 in particular) to insure that wind loads will only result in the loading of the grooves in tensile and compression (shear loading), and where a sign 15 (see FIGS. 1 and 6) is disposed on the upright member 15 above the coupling means 16, the web 17 surfaces containing the grooves 18 are disposed in planes generally parallel to the sign 15.

In some embodiments of the invention (FIGS. 1-5), the webs forming the coupling means 16 are quadrate plates having two web faces, two side edges 29, 29', and top and bottom edges 30, 30', respectively. Although the plates may be constructed of any suitable material, it is preferred that they be formed as aluminum castings or as aluminum extrusions.

The grooves 18 in the plates may be provided in both or just one face of the plates, as illustrated in FIGS. 17a and 17b, respectively, two grooves formed in the opposite plate faces being disposed in a common plane transverse to the plate faces. Generally, the grooves 18 will be formed so that 10 to 40 percent of the thickness of the plates remains at the area of the groove, and the grooves are generally "V" or "U" shaped. As illustrated in FIGS. 18 through 23, however, the grooves may be formed as through-going slits, which communicate with the central opening 20 and terminate short of the ends of the web 17.

Figure 2:
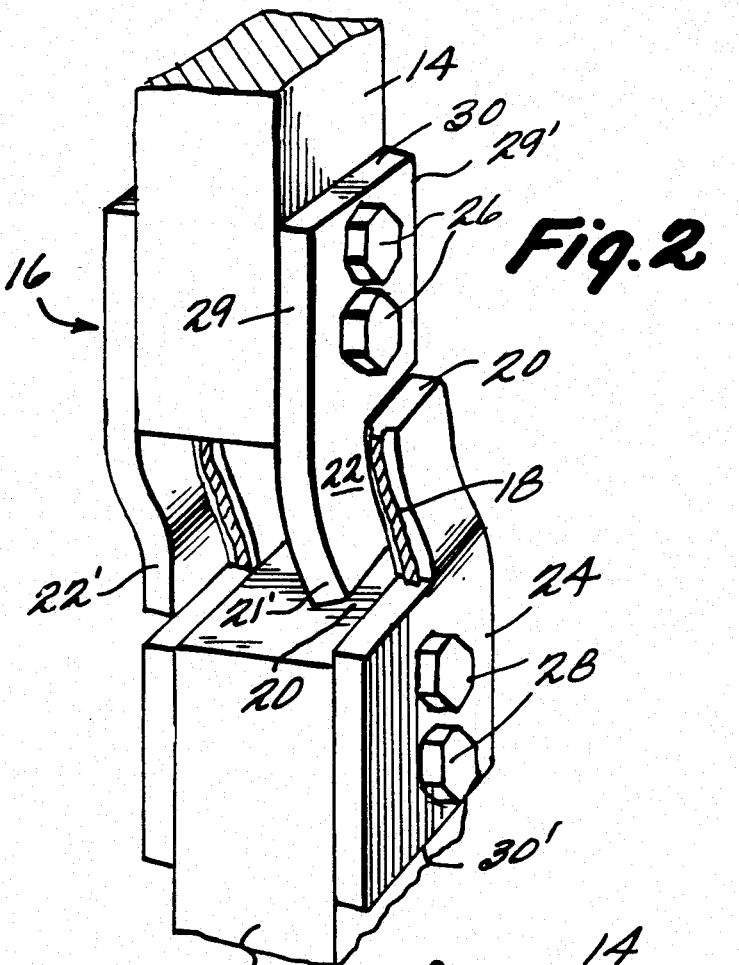
FIG. 2 is a detail perspective view showing the failure of the coupling means when the assembly is subjected to a horizontal impact load.

In the embodiment of FIGS. 1 and 2, each of the plates forming the coupling means 16 includes one groove 18, and two transverse openings 20 opening from opposite ends of the groove 18 toward the plate side edges 29, 29', respectively. The two plates on opposite sides of the members 12, 14 are mounted so that the grooves 18 in the two plates are coplanar, and so that the tongue portions 22' of the first portions 22 are disposed on the same side of the grooves 18, and the tongue portions 24' of the plate's second portions 24 are disposed on the same side of the grooves 18, as shown in FIG. 2.

Figure 3:
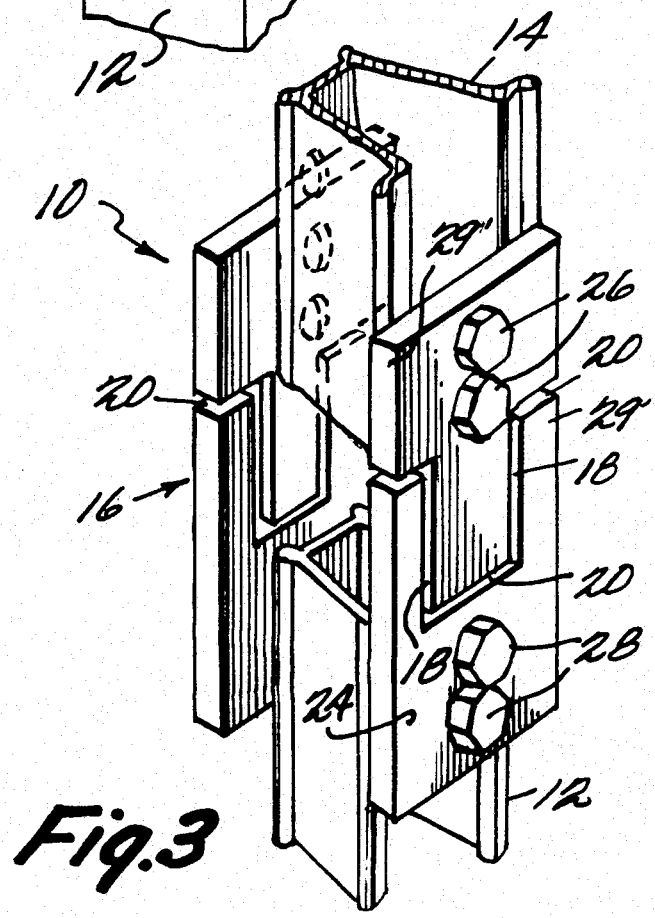

In the FIG. 3 embodiment, each plate of the coupling means 16 includes two grooves 18 and three transverse openings 20, one transverse opening 20 extending from one end of each of the grooves to the plate side edges 29, 29', respectively, and the other transverse opening extending between the other ends of the grooves 18, and providing an end termination thereof. The embodiment of FIG. 2 is less direction-sensitive than the embodiment of FIG. 3, although both embodiments have an operational zone of failure of where is equal to about 40 degrees (20 degrees on either side of a horizontal impact load transverse to the plates).

The embodiments of FIGS. 4 and 5 are similar except that in the FIG. 5 embodiment there are four grooves 18 (in each face) having one transverse opening 20 commonly terminating ends thereof, while in the FIG. 4 embodiment, only two grooves 18 are provided with the common transverse opening 20, no other metal being provided between extensions of the grooves 18 in the lower portion 24 of the web. The FIG. 4 embodiment is advantageous in that it utilizes less metal; however, the FIG. 5 embodiment is advantageous in that either side thereof may be attached to tither member 12, 14, whereas in the FIG. 4 embodiments, care must be taken to see that the portion 22' is disposed coincident with the upright member 14 (unless the upright 14 is thinner than the distance between the two grooves 18, which is not desirable). U-bolts may be provided as part of the mounting means 28 if desired in the FIG. 4 embodiment.

In the embodiment shown in FIGS. 6, 7, 9, 12 and 13, the web forming coupling means 16 is most readily formed as an aluminum extrusion, having upturned side portions 32 generally perpendicular to face 34 containing the attaching means 26, 28, so that it has more or less a C cross section. In these embodiments, preferably four grooves 18 are provided with a single transverse opening 20. Two webs 16 are normally provided mounting an upright 14, and the upturned side portions 32 of the two webs face in opposite directions, although they are coplanar with the corresponding upturned portions 32 of the opposite web.

The channel shape of the webs of FIGS. 6, 7, 9, 12 and 13 is advantageous in the at such webs have larger shear strength and are capable of supporting greater weight loadings than are flat plates. In the FIGS. 6, 7 and 9 embodiment, the grooves 18 are formed in the central face 34 containing the attaching means 26, 28 and opening 20, while the FIG. 12 and 16 embodiment, the grooves are formed in the side portions 32 at the line of intersection with the central face 34 (the start 18 of each groove 18 essentially being in the plane of face 34). In either the FIGS. 6 and 12 embodiments, the groove 18 axes must be orientated so that the face containing them is perpendicular to the direction of impact for the FIG. 6 embodiment so that central face 34 is perdpendicular to the direction of impact for the FIG. 6 embodiment so that central face 34 is perpendicular, and for the FIG. 12 (see FIG. 16 too) embodiment the faces 32 are perpendicular.

Figure 10A:
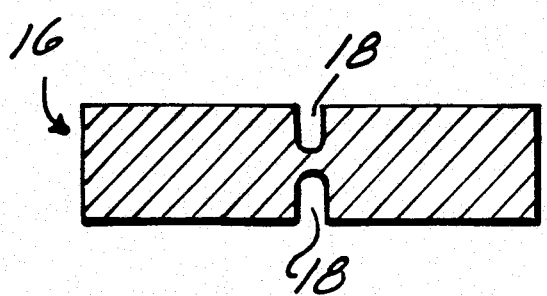
FIG. 10 is a partial detail view of another embodiment of the coupling means according to the invention having groove axes formed on a web portion perpendicular to the portion having attaching means associated therewith.
Figure 10B:
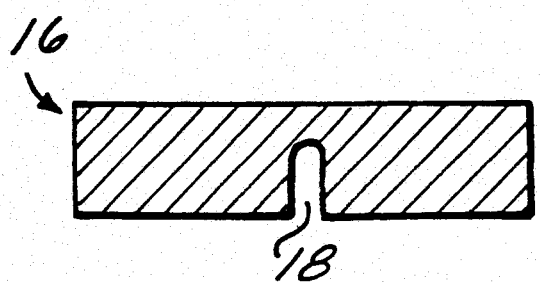
Figure 10:
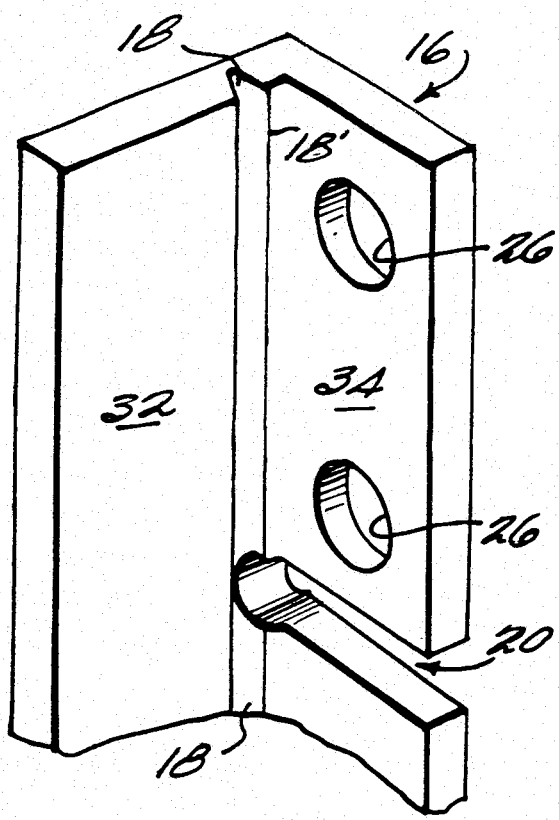
Figure 11:
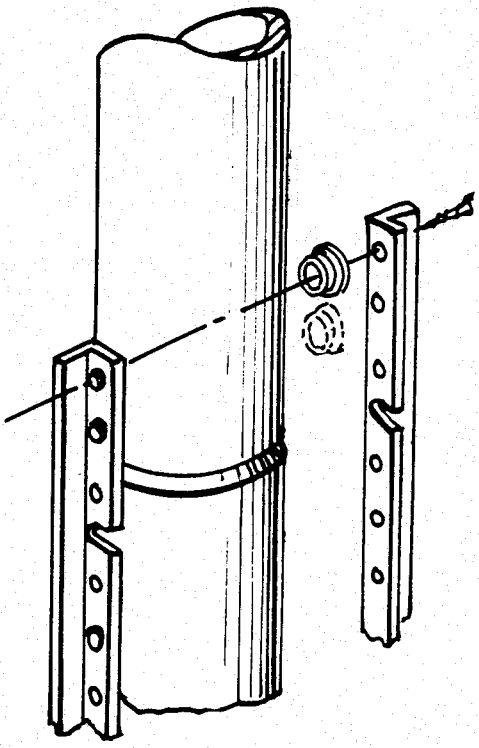
FIG. 11 is a perspective view of an exemplary upright assembly utilizing the coupling of FIG. 10 embodiment.
Figure 12:
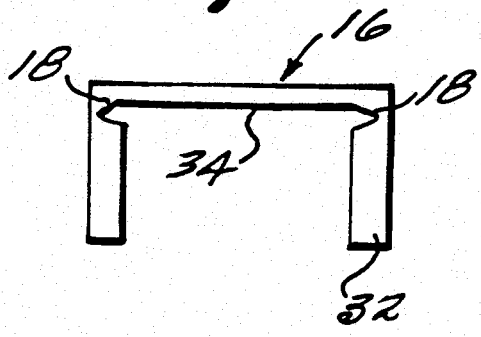
FIG. 12 is a top view of modification of the coupling of FIG. 10.

In the FIG. 10 embodiment, a coupling is illustrated having a single side portion 32 generally perpendicular to face 34 which contains the attaching means 26, 28. In this embodiment, the groove 18 is formed in the portion 32. FIG. 11 illustrates an exemplary upright assembly utilizing the coupling 16 of FIG. 10, the groove 18 axis being parallel to the line of impact and the assembly. Cup washers 35 may be used to relieve bearing loads on the pole adjacent to the fastening bolts.

Figure 13:
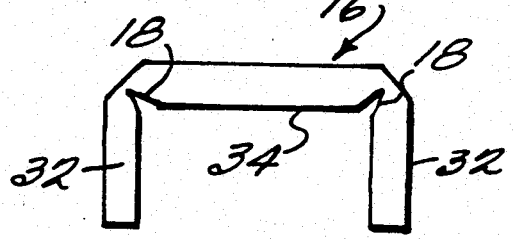
FIG. 13 is a top view of another modification of the coupling according to the invention showing the groove axes at 45 degrees with respect to a perpendicular to a face of the web.
Figure 14:
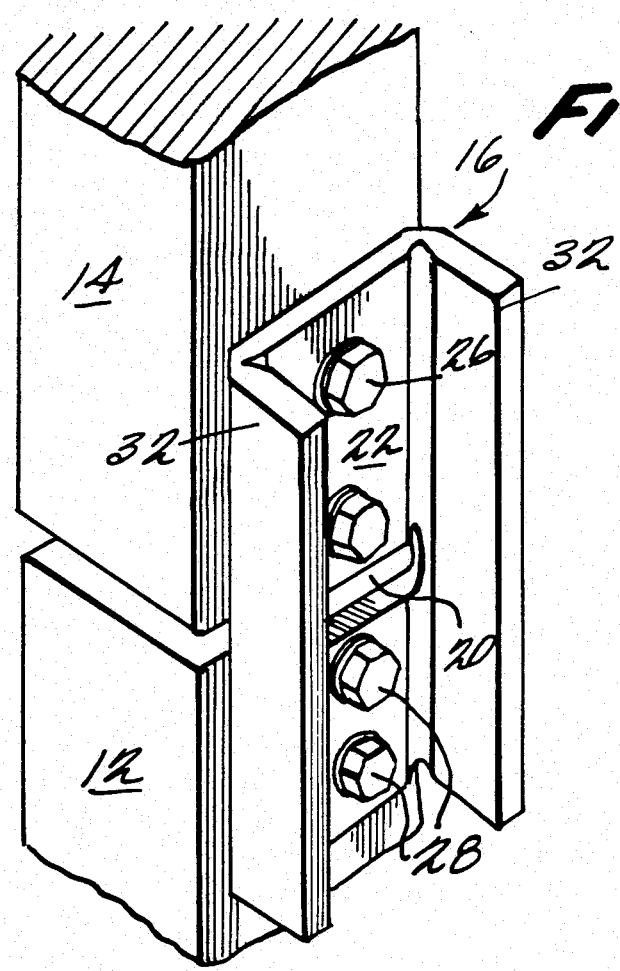
FIG. 14 is a perspective view of an upright assembly utilizing the coupling of FIG. 13.
Figure 15:
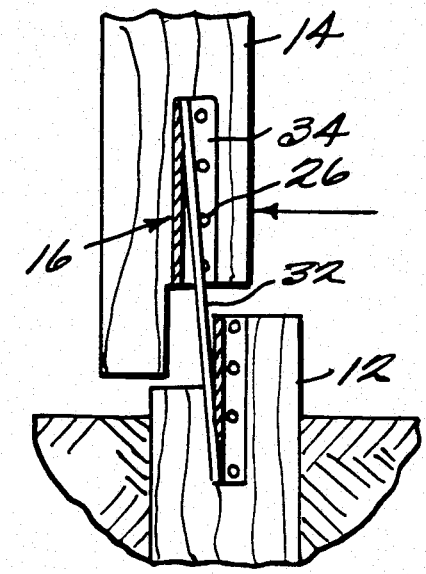
FIGS. 15 and 16 are side and perspective views, respectively, showing the manner of failure of the couplings of FIGS. 10 and 12, respectively, when subjected to an impact load.
Figure 16:
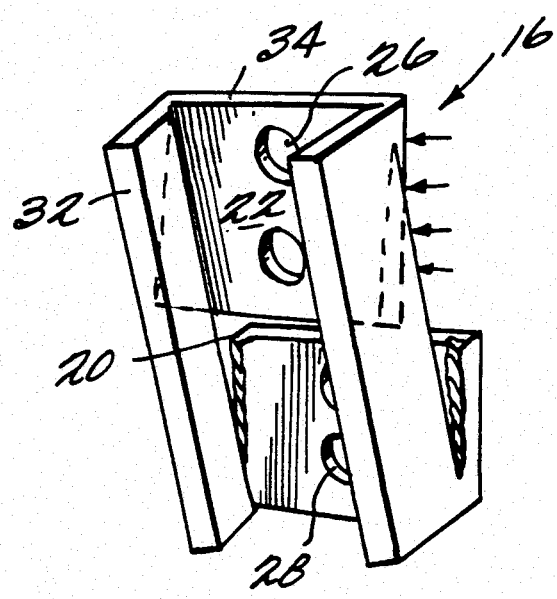

The FIG. 13 and 14 embodiment provides the grooves 18 in the area of intersection between the faces 32, 34, the groove axes being such that they make an angle of about 45 degrees with respect to a perpendicular N to either of the faces 32, 34. This embodiment is advantageous in that it is almost completely direction insensitive, yet omnidirectional bending stiffness is provided, and also since in some circumstances only one channel 16 need be used in the assembly (see FIG. 14). Of course, more than one channel may be used if desired, and when the upright and base members 12, 14 comprise poles, the faces 32 may be disposed so that they encircle the pole.

Figure 9:
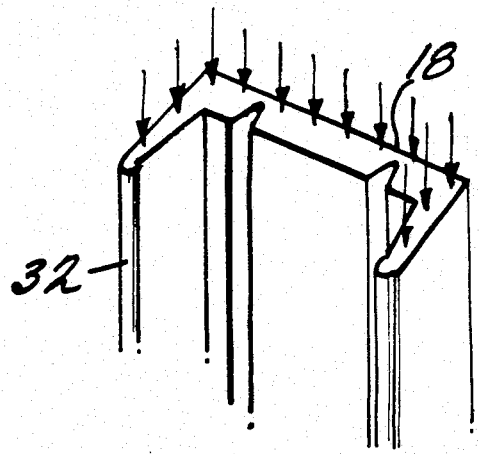
FIG. 9 is a partial detail view of a coupling according to the FIG. 6 embodiment, illustrating the wind or weight loads acting thereon.
Figure 8A:
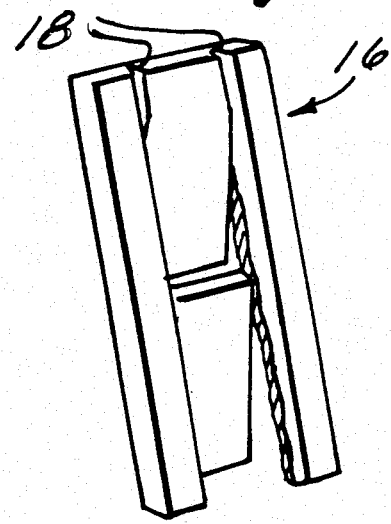
FIGS. 8a and 8b are perspective and side views, respectively, showing the manner of failure of the assembly of FIG. 5 when subjected to an impact load.
Figure 8B:
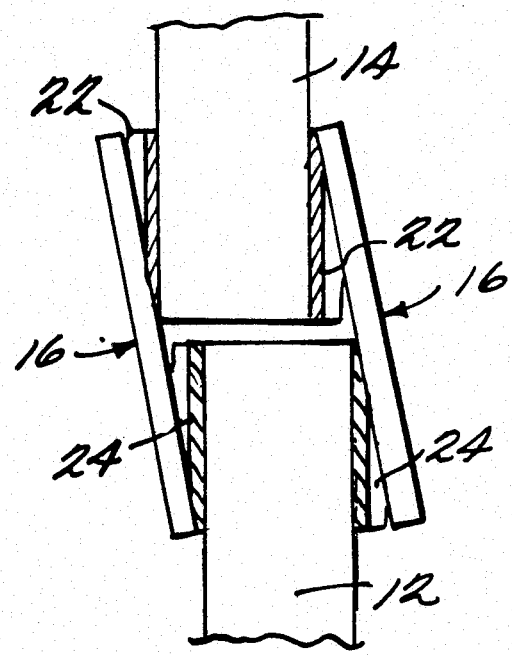

FIGS. 2, 8a, 8b 15 and 16 show the mode of fracture of the couplings 16 according to the present invention under an impact load. Each of the webs will start to tear along one or more grooves 18 starting first adjacent an opening 20, and continuing until another opening 20 or the end of the web. FIG. 9 shows the tensile and compressive forces that act on a coupling 16 as a result of wind and weight loadings so that a clear comparison can be made between the bending (tearing) mode of the couplings as a result of horizontal impact, and the shear mode of the couplings due to tensile and compressive loadings.

In plates wherein only one transverse opening 20 is provided, normally the other end of the groove(s) will continue all the way to the end of the coupling (i.e., see FIG. 6), although if desired the groove could be terminated just short of the plate end as long as such termination did not prevent complete tearing. Additionally, fracture initiating means may be provided at the portion of the groove directly at a transverse opening 20 (i.e., the groove may be deeper directly adjacent the opening 20 than along the rest of its length). Where the members 12, 14 are made of wood or like material, shear (cup) washers may be provided around the bolts attaching the couplings to the members 12, 14, to relieve the bearing loads on the wood adjacent the bolts.

The modifications of the invention illustrated in FIGS. 18 through 23 are designed particularly for ease of manufacture. For instance the coupling illustrated in FIGS. 18 through 20 may be very easily cast, such as from aluminum, while the coupling illustrated in FIGS. 21 through 23 may be easily stamped, such as from steel (e.g. carbon steel). In both embodiments, the grooves are defined as through-extending slits. For instance in FIG. 18 first and second slits 51, 52 are provided communicating with opening 20 and extending in a dimension generally perpendicular to the dimension in which opening 20 extends. The slits 51, 52 are generally parallel to each other. Third and fourth slits 53, 54 are also provided which extend generally parallel to each other, generally perpendicular to the opening 20, and in a direction opposite the direction of the slits 51, 52. The slits 51, 52 define the first web portion 22 therebetween, while the third and fourth slits 53, 54 define the second web portion 24 therebetween.

Figure 18:
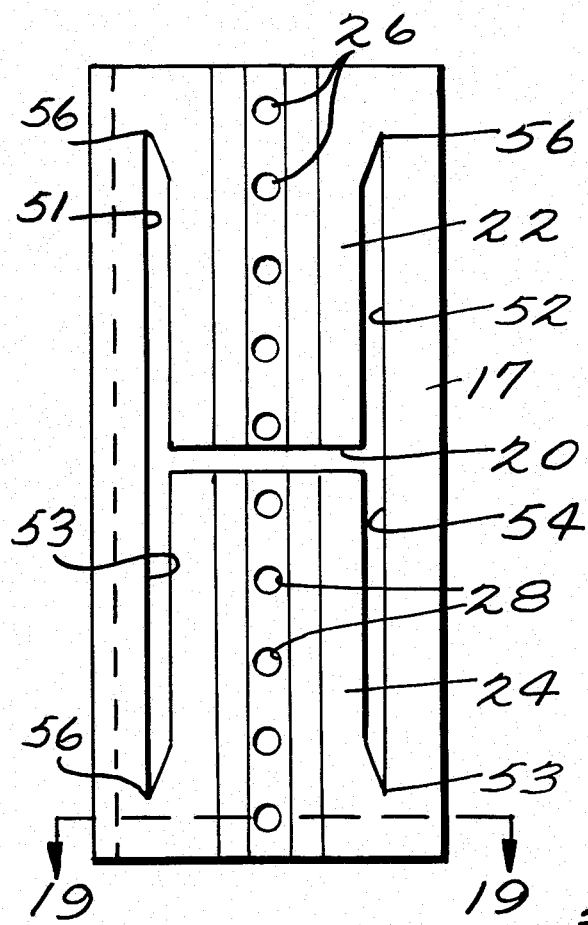
FIG. 18 is a top plan view of another modification according to the present invention, which is constructed and designed to be readily casted and has increased bending stiffness.
Figure 20:
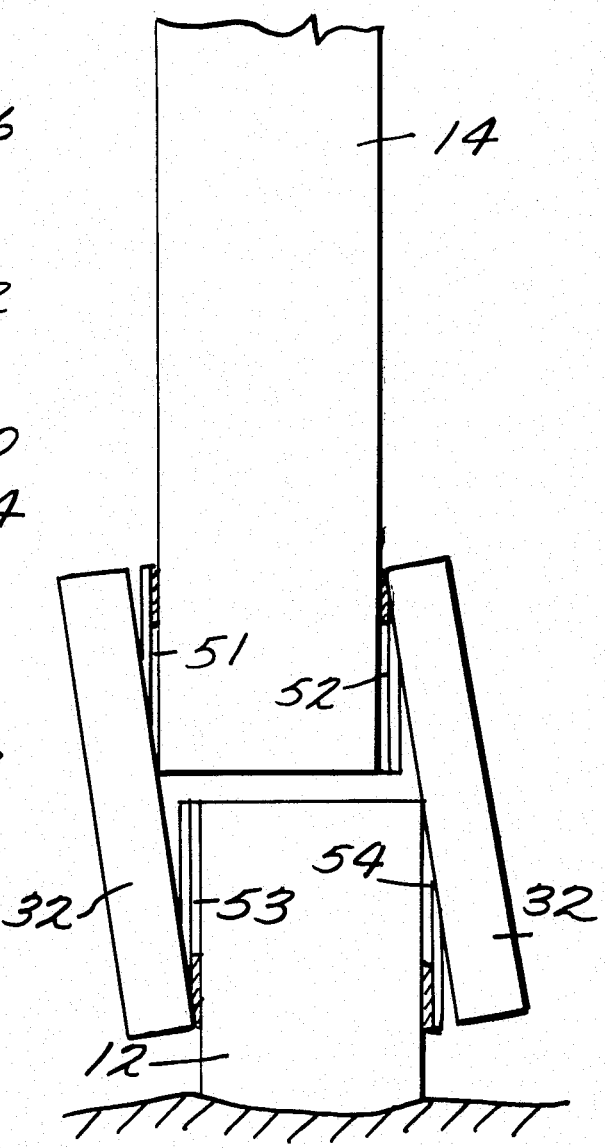
FIG. 20 is a side view of the coupling of FIGS. 18 and 19 attached to an upright member and base member, showing the manner of failure of the assemblying when subjected to an impact load.
Figure 19:
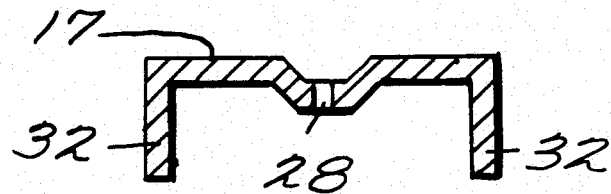
FIG. 19 is a cross-sectional view of the coupling of FIG. 18 taking along lines 19—19 thereof.

The slits 51–54 terminate short of the end of the web 17, having out-of-plane tearing stress terminations. Such terminations are illustrated in FIG. 18 as the tapered points 56. Fastener-receiving openings 26, 28 are formed in the first and second web portions 22, 24, respectively, for facilitating attachment of the web portions to a vertically upstanding base 12, and a vertical upright member 14 (see FIG. 20). Upturned side portion 32 are also preferably provided in this embodiment for providing larger shear strength, increased stiffness under bending loads, etc.

In the modification illustrated in FIGS. 21 through 23, again the vertical grooves have had the thickness of the remaining material reduced to zero, defining through-extending slits. The slits in this embodiment are comparable to the slits in the FIG. 18 embodiment, only the reference numerals referencing the same are followed by a "'". The modification of FIGS. 21 through 23 is designed to be stamped from a metal plate, such as a steel plate (e.g. carbon steel). The slits 51 (through 54) are not exactly parallel to each other or perpendicular to the opening 20, being only generally parallel and perpendicular. The end terminations of the slits are formed in a manner facilitating the stamping operation. For instance the end termination may be formed from a punched-out diamond-shaped opening as indicated generally at 56', or a from tear-shaped punched-out opening illustration generally at 56", or the like. Tearing takes place along the lines 58.

In the embodiment of FIGS. 21 through 23, during the stamping operation portions of the first and second web portions 22, 24, respectively are raised. These raised portions provide means for increasing stiffness of the first and second web portions 22, 24 and additionally comprise means for increasing stress concentrations (at terminations 56', 56") for out-of-plane tearing. The construction of such raised portions is readily seen from an inspection of FIGS. 21 through 23.

According to the present invention, a method of stamping a frangible coupling for use in an upright assembly from a metal plate is possible. The embodiment of FIGS. 21 through 23, with the grooves defined as the through-extending slits 51' through 54', is constructed by stamping. The entire structure is capable of stamping in a single operation utilizing appropriate tooling, no necessity for machining being necessary. Thus, stamping is effected by practicing the steps of forming the through-extending opening 20, forming the slits 51' through 54', forming the terminations 56' or 56", and forming the fastener-receiving openings 26, 28. The stamping also may include the steps of raising a portion of the web portions 22, 24 with respect to the plate at the slits 51' through 54', and turning up the edges 32 to provide a general channel-shape.

The assembly according to the present invention is useful with any type of upright of virtually any shape, including standard U-post signs, wooden signs, utility poles, and other vertical poles, whether made of wood, metal or concrete.

It will thus be seen that according to the present invention an improved upright assembly, and coupling web therefore, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed:

1. An upright assembly comprising;
(a) a generally vertical upright member; (b) a generally vertical base member; (c) at least one web comprising (i) means defining at least one linear generally vertical groove therein, (ii) means defining a through-extending opening adjacent at least one end of said groove and generally transverse thereto, said opening defining a first portion of said web on one side thereof, and a second portion of said web on the other side thereof, so that the portion of the web on either side of said opening will separate under impact loading; (d) means for attaching said first web portion to one of said members; and (e) means for attaching said second web portion to the other of said members, wherein the improvement comprises:
said means defining at least one linear generally vertical groove in said web comprises means defining a plurality of through-extending slits including a first through-extending slit extending from said through-extending opening in a first direction, a second through-extending slit extending from said through-extending opening generally parallel to said first slit and defining said first web portion therebetween, a third through-extending slit extending from said through-extending opening in a second direction, opposite said first direction, and a fourth through-extending slit extending from said through-extending opening generally parallel to said third slit and defining said second web portion therebetween; each of said through-extending slits terminating short of the end of said web and having an out-of-plane tearing stress concentrating termination.

2. An upright assembly comprising:
a generally vertical upright member;
a generally vertical base member;
coupling means for connecting said upright and base member together so that a horizontal impact loading is distinct from wind and weight loading, so that said coupling means will fail in an out-of-plane tearing mode in response to an impact force of magnitude F applied to said upright member in a generally horizontal direction yet will not fail in any mode as a result of a compression or tensile loading F; said coupling means comprising a pair of webs disposed on opposite sides of said upright and base members and wherein each of said webs comprises: means defining at least one linear generally vertical groove therein, a face containing said groove being transverse to an expected horizontal impact loading; and means defining a through-extending opening adjacent at least one end of said groove and generally transverse thereto, said opening defining a first portion of said web on one side thereof, and a second portion of said web on the other side thereof, so that the portions of the web on either side of said opening will separate under impact loading;
means for attaching said first web portion of each web to one of said member; and
means for attaching said second web portions of each web to the other of said members; wherein the improvement comprises:
said means defining at least one linear generally vertical groove in said web comprises means defining a plurality of through-extending slits including a first through-extending slit extending from said through-extending opening in a first direction, a second through-extending slit extending from said through-extending opening generally parallel to said first slit and defining said first web portion therebetween, a third through-extending slit extending from said through-extending opening in a second direction, opposite said first direction, and a fourth through-extending slit extending from said through-extending opening generally parallel to said third slit and defining said second web portion therebetween; each of said through-extending slits terminating short of the end of said web and having an out-of-plane tearing stress concentrating termination.

3. An assembly as recited in claims 1 or 2 further comprising means for increasing stiffness of said first and second web portions, and for increasing stress concentrations for out-of-plane tearing.

4. An assembly as recited in claims 1 or 2 wherein the edges of said web on either side of said slits are upturned so as to provide increased bending stiffness of said web.

5. An assembly as recited in claims 1 or 2 wherein said means for attaching said web portions to said members include means defining a plurality of fastener-receiving openings in each of said first and second web portions, between said first and second slits and said third and fourth slits, respectively.

6. An assembly as recited in claim 3 wherein said first and second web portions include portions containing said slits, and a portion between said slits, and wherein said portions containing said slits are in a different plane than said portion between said slits.

7. A method of stamping a frangible coupling for use in an upright assembly, from a metal plate, the stamping effected by practicing the steps of forming a through-extending opening in said plate, the opening extending in a first dimension;

forming four through-extending slits in the plate communicating with the through-extending opening and extending in a second dimension generally perpendicular to the first dimension, first and second of the slits extending in a first direction in the second dimension and defining a first web portion therebetween, and third and fourth of the slits extending in a second direction in the second dimension and defining a second web portion therebetween;

forming an out-of-plane tearing stress concentrating termination of each of the slits, the terminations being short of the end of the plate; and forming a plurality of fastener-receiving openings in the first and second web portions.

8. A method as recited in claim 7 wherein the first and second web portions each include portions thereof at the silts, and a portion thereof between the slits; and comprising the further step of acting on the first and second web portions so that the portions thereof at the slits are in a different plane than the portion thereof between the slits.

9. A method as recited in claims 7 or 8 comprising the further step of turning up the edges of the plate so that they extend generally perpendicularly to the first and second web portions.

10. A method as recited in claims 7 and 8 wherein the metal plate is a steel plate.

11. An upright assembly comprising:
(a) a generally vertical upright member;
(b) a generally vertical base member;
(c) at least one web comprising: (i) means defining a through-extending opening in said web, said opening defining a first portion of said web on one side thereof, and a second portion of said web on the other side thereof, so that the portion of the web on either side of said opening will separate under impact loading; and (ii) means defining a plurality of through-extending slits including a first through-extending slit extending from said through-extending opening in a first direction, a second through-extending slit extending from said through-extending opening generally parallel to said first slit and defining said first web portion therebetween, a third through-extending slit extending from said through-extending opening in a second direction, opposite said first direction, and a fourth through-extending slit extending from said through-extending opening generally parallel to said third slit and defining said second web portion therebetween; each of said through-extending slits terminating short of the end of said web and having an out-of-plane tearing stress concentrating termination; said opening extending generally transverse to said slits;

(d) means for attaching said first web portion to one of said members; and (e) means for attaching said second web portion to the other of said members.

12. An upright assembly comprising:
a generally vertical upright member;
a generally vertical base member;
coupling means for connecting said upright and base member together so that a horizontal impact loading is distinct from wind and weight loading, so that said coupling means will fail in an out-of-plane tearing mode in response to an impact force of magnitude F applied to said upright member in a generally horizontal direction yet will not fail in any mode as a result of a compression or tensile loading F; said coupling means comprising a pair of webs disposed on opposite sides of said upright and base members and wherein each of said webs comprises: means defining a through-extending opening in said web, said opening defining a first portion of said web on one side thereof, and a second portion of said web on the other side thereof, so that the portions of the web on either side of said opening will separate under impact loading; and means defining a plurality of through-extending slits including a first through-extending slit extending from said through-extending opening in a first direction, a second through-extending slit extending from said through-extending opening generally parallel to said first slit and defining said first web portion therebetween, a third through-extending slit extending from said through-extending opening in a second direction, opposite said first direction, and a fourth through-extending slit extending from said through-extending opening generally parallel to said third slit and defining said second web portion therebetween; each of said through-extending slits terminating short of the end of said web and having an out-of-plane tearing stress concentrating termination; said opening extending generally transverse to said slits;

means for attaching said first web portion of each web to one of said member; and means for attaching said second web portions of each web to the other of said members.

13. An assembly as recited in claims 11 or 12 further comprising means for increasing stiffness of said first and second web portions, and for increasing stress concentrations for out-of-plane tearing.

* * * * *